United States Patent
Martling

(10) Patent No.: US 6,883,329 B1
(45) Date of Patent: Apr. 26, 2005

(54) METHOD OF FUEL NOZZLE SIZING AND SEQUENCING FOR A GAS TURBINE COMBUSTOR

(75) Inventor: Vincent C. Martling, Boynton Beach, FL (US)

(73) Assignee: Power Systems MFG, LLC, Jupiter, FL (US)

(*) Notice: Subject to any disclaimer, the term of this patent is extended or adjusted under 35 U.S.C. 154(b) by 93 days.

(21) Appl. No.: 10/350,756

(22) Filed: Jan. 24, 2003

(51) Int. Cl.$^7$ ................................................. F02C 7/22
(52) U.S. Cl. ............................................. 60/746; 60/739
(58) Field of Search ........................... 60/739, 746, 772, 60/773, 39.281

(56) References Cited

U.S. PATENT DOCUMENTS

| | | | |
|---|---|---|---|
| 5,024,055 A | * 6/1991 | Sato et al. | ............... 60/39.281 |
| 5,137,046 A | 8/1992 | Sollman | |
| 5,211,004 A | 5/1993 | Black | |
| 5,327,718 A | * 7/1994 | Iwata et al. | ................... 60/773 |
| 5,365,732 A | * 11/1994 | Correa | ..................... 60/39.281 |
| 5,423,175 A | 6/1995 | Beebe et al. | |
| 5,661,969 A | 9/1997 | Beebe et al. | |
| 5,899,073 A | 5/1999 | Akimaru | |
| 6,637,184 B1 | * 10/2003 | Freeman | ....................... 60/773 |
| 6,722,135 B1 | * 4/2004 | Davis et al. | ................... 60/773 |

* cited by examiner

Primary Examiner—Michael Koczo
(74) Attorney, Agent, or Firm—Brian R. Mack

(57) ABSTRACT

A method for providing a gas turbine engine and a combustor having a more uniform fluid flow is disclosed. For a combustor end cover, individual nozzle flow rates are determined and nozzles positioned on an end cover such that each nozzle injects substantially the same amount of fluid as an adjacent nozzle. As a result, gas temperature variations within the combustor are reduced and combustion dynamics lowered. For a gas turbine engine utilizing a plurality of combustors, individual end cover flow rates are determined and end covers positioned on each combustor relative to the supply inlet of the engine such that each end cover is supplied with a substantially similar flow rate. Other factors including pressure loss and fluid temperature changes are taken into consideration when determining nozzle and end cover positions.

14 Claims, 4 Drawing Sheets

Figure 1 – Prior Art

METHOD OF FUEL NOZZLE SIZING AND SEQUENCING FOR A GAS TURBINE COMBUSTOR

BACKGROUND OF THE INVENTION

1. Field of the Invention

This invention relates to fuel injection system of a gas turbine combustor and more specifically, to a method for balancing fuel flow to a plurality of fuel nozzles and to a plurality of combustor end covers about a gas turbine engine.

2. Description of Related Art

The U.S. Government has enacted requirements for lowering pollution emissions from gas turbine combustion engines, especially nitrogen oxide (NOx) and carbon monoxide (CO). These emissions are of particular concern for land based gas turbine engines that are used to generate electricity since these types of engines usually operate continuously and therefore emit steady amounts of NOx and CO. A variety of measures have been taken to reduce NOx and CO emissions including the use of catalysts, burning cleaner fuels such as natural gas, and improving combustion system efficiency. One of the more significant enhancements to land based gas turbine combustion technology has been the use of premixing fuel and compressed air prior to combustion. The resulting mixture is lean with respect to fuel concentration, and in some systems, can approach the lean flammability limit, or the point where combustion can no longer occur. When the resulting mixture does react and combustion occurs, a lower flame temperature results and lower levels of NOx are produced.

Since this type of combustion system operates close to the lean flammability limit, combustion is not as stable as the more typical diffusion flame combustion systems. Combustion instabilities are produced by oscillations in the combustor pressure field and can vary based on a variety of factors including fuel pressure, air pressure, turbine effects, and communication with adjacent combustors. These pressure oscillations, if not minimized and adequately controlled, can affect the integrity and life of the combustor.

Another issue of concern to operators of premix combustion systems is the effect of prolonged combustor wall exposure to elevated temperatures, especially non-uniform temperature distribution. Typically premix combustion systems contain a plurality of fuel nozzles for injecting fuel and mixing it with compressed air within a single combustor. More specifically, for land based gas turbine engines that are utilized to generate electricity, a plurality of combustion systems are typically required. Therefore, given the large amount of fuel nozzles on a given engine, a wide variety of fuel/air mixtures and flame temperatures are possible for each region of the combustor. If each fuel nozzle is injecting a slightly different amount of fuel when combustion occurs, the flame temperature will vary circumferentially about the combustor, depending on the mixture quality and fuel/air ratio for that particular region. That is, the more fuel rich regions will tend to have a higher flame temperature than leaner regions of the combustor. Also, the more poorly mixed regions will tend to not burn as completely as the better mixed regions, resulting in higher NOx emissions. This flame temperature fluctuation or variance will result in uneven temperature exposure to the combustor walls, which can lead to accelerated degradation requiring more frequent repairs and premature replacement of combustion components.

In an effort to control fuel flow and resulting combustion dynamics, prior art gas turbine combustors have utilized restriction devices such as meterplates. An example of this technology is shown in FIG. 1 and discussed in detail in U.S. Pat. No. 5,211,004. In practical use, a plurality of fuel nozzles are arranged about a housing 32 having a fitting 40 with a plurality of bores 52 serving to form a meterplate. The fuel nozzles in question may inject natural gas, liquid fuel, or both. Gas from annulus 50 is restricted by bores 52 before filling chamber 54 and being injected into a combustion chamber through orifice 56. Chamber 54 is filled with gas at a predetermined pressure, as a result of fitting 40 and bores 52, sufficient to supply a steady flow of fuel to compensate for pressure fluctuations in the combustion chamber. While this metering technology claims to reduce combustion dynamics, the plurality of fuel nozzles about housing 32 do not have balanced fuel flow rates relative to the supply of fuel to housing 32 and therefore still subject the combustion chamber to flame temperature fluctuations resulting in localized regions of distress. What is needed for a combustion system, which contains a plurality of fuel nozzles, is a configuration that not only helps to minimize combustion pressure oscillations and combustion dynamics but also to reduce flame temperature variations, such that the combustion chamber walls are exposed to a more uniform temperature distribution. The present invention accomplishes each of these tasks by disclosing a method of arranging nozzles about a combustor end cover as well as arranging a plurality of end covers about a gas turbine engine in order to provide a generally consistent fluid flow to each combustor while minimizing flame temperature variation and reducing overall emissions.

SUMMARY AND OBJECTS OF THE INVENTION

In accordance with the present invention, the dynamic pressure levels are reduced and a more uniform flame temperature distribution is created within a combustion chamber by determining the respective flow characteristics of each of the nozzles and positioning each nozzle at an optimum location on a combustor end cover. The optimum location is determined by a combination of compensating for measured and calculated pressure losses, changes in fluid medium temperature, and effective flow area of each nozzle, such that each nozzle, when positioned on a combustor end cover, provides a substantially uniform fluid flow to the combustion chamber. This same method can be applied to a plurality of combustor end covers within a multi-combustor gas turbine engine, such that each combustor receives a substantially uniform fluid flow regardless of position relative to the fluid supply source.

It is an object of the present invention to disclose a method for providing a combustor end cover that emits a generally uniform flow of fluid from each nozzle.

It is a further object of the present invention to disclose a method for providing a gas turbine engine that contains a plurality of combustors, each combustor receiving a generally uniform fluid flow and having a generally uniform flame temperature.

In accordance with these and other objects, which will become apparent hereinafter, the instant invention will now be described with particular reference to the accompanying drawings.

DETAILED DESCRIPTION OF THE PREFERRED EMBODIMENT

Figure 1:
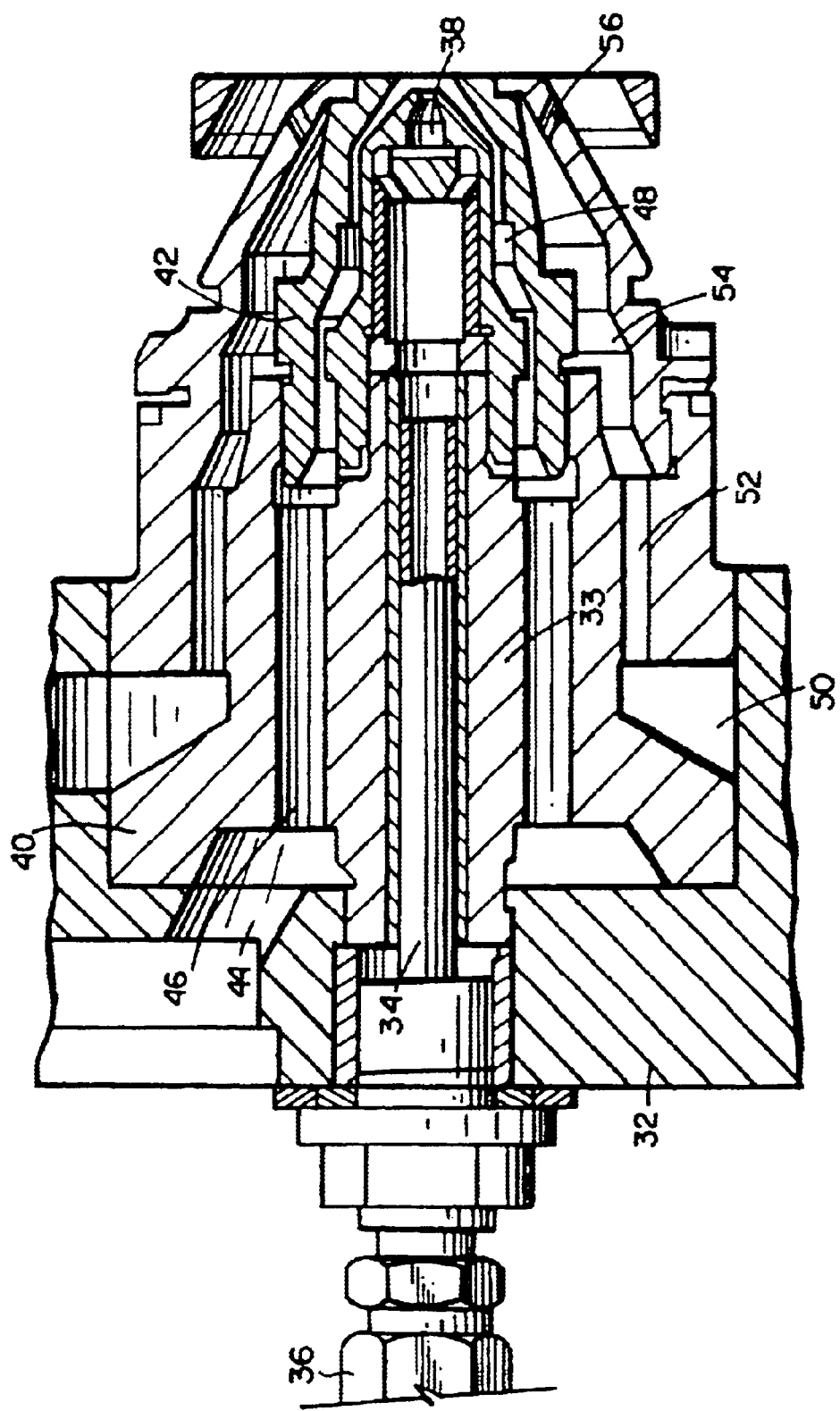
FIG. 1 is a partial cross section view of a combustor end cover of the prior art.
Figure 2:
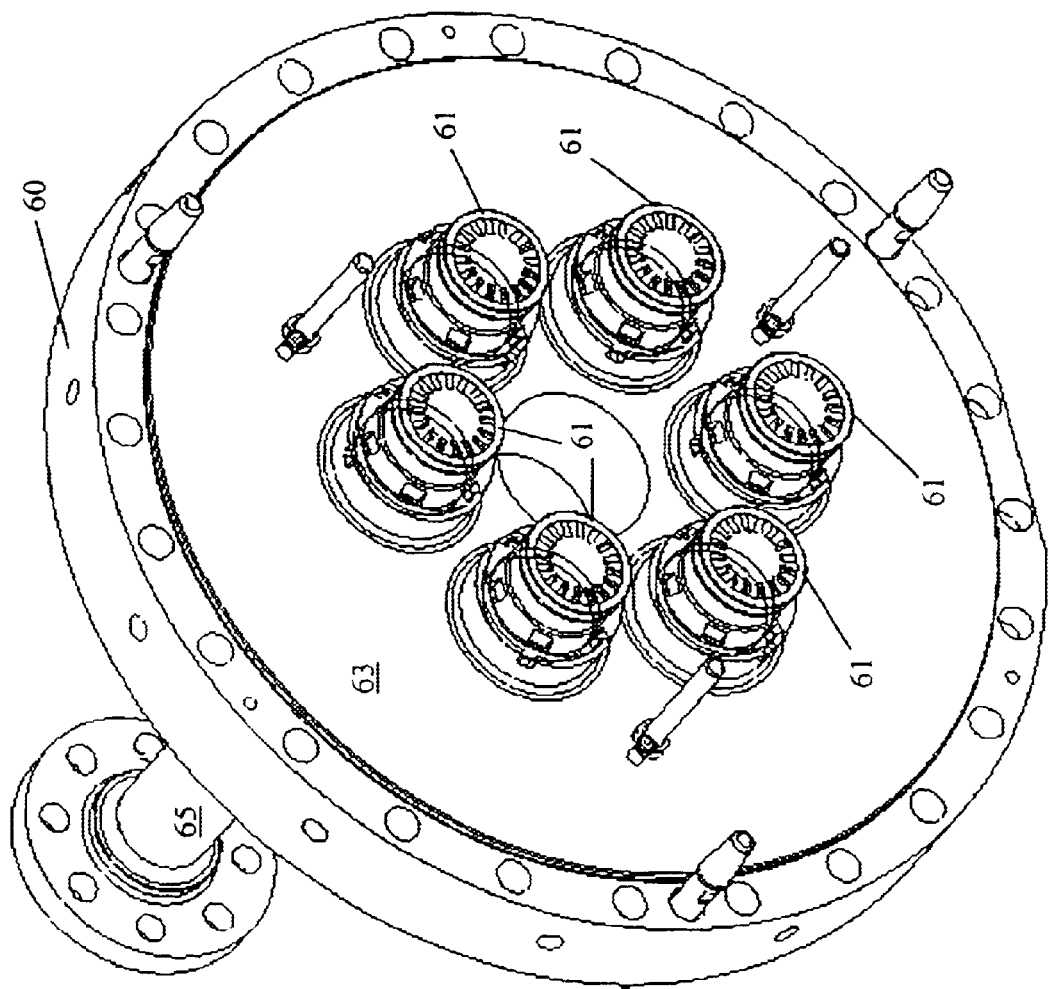
FIG. 2 is a perspective view of a combustor end cover incorporating the present invention.

The present invention, which will now be described in detail, is shown in the accompanying FIGS. 2–4. Referring now to FIG. 2, an end cover 60, which is used to enclose a combustion chamber for a gas turbine engine, is shown in perspective view. End cover 60, which is preferably circular in cross section, is shown containing a plurality of nozzles 61, typically at least two, which are fixed to end cover 60. In order to provide an end cover having generally uniform fuel flow to a combustion chamber, which will result in a more uniform flame temperature throughout the combustor and reduce combustor dynamics, a number of operations must occur to end cover 60 and nozzles 61 before they are assembled on the engine.

Figure 3:
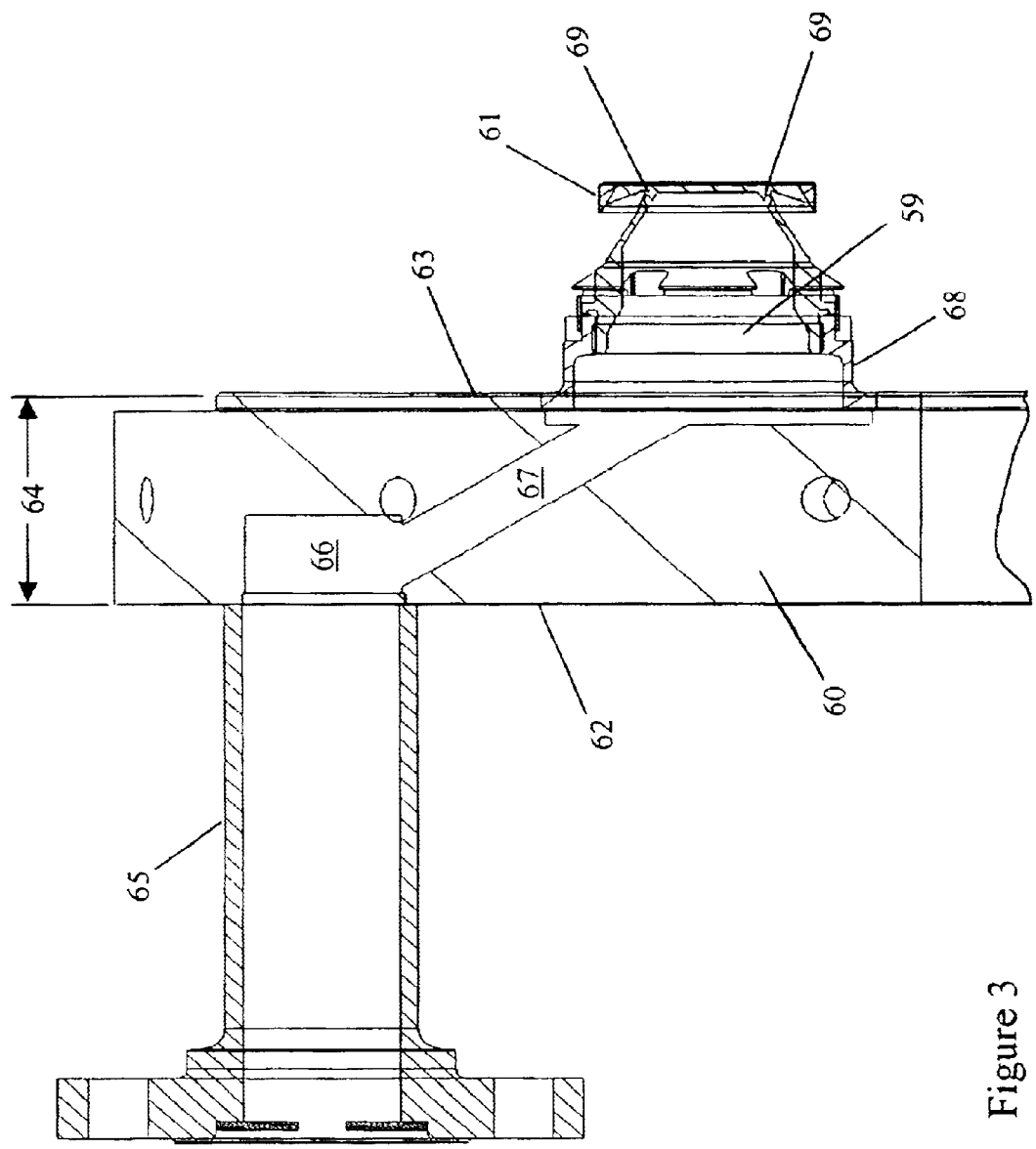
FIG. 3 is a partial cross section view of a combustor end cover and fuel nozzle incorporating the present invention.
Figure 4:
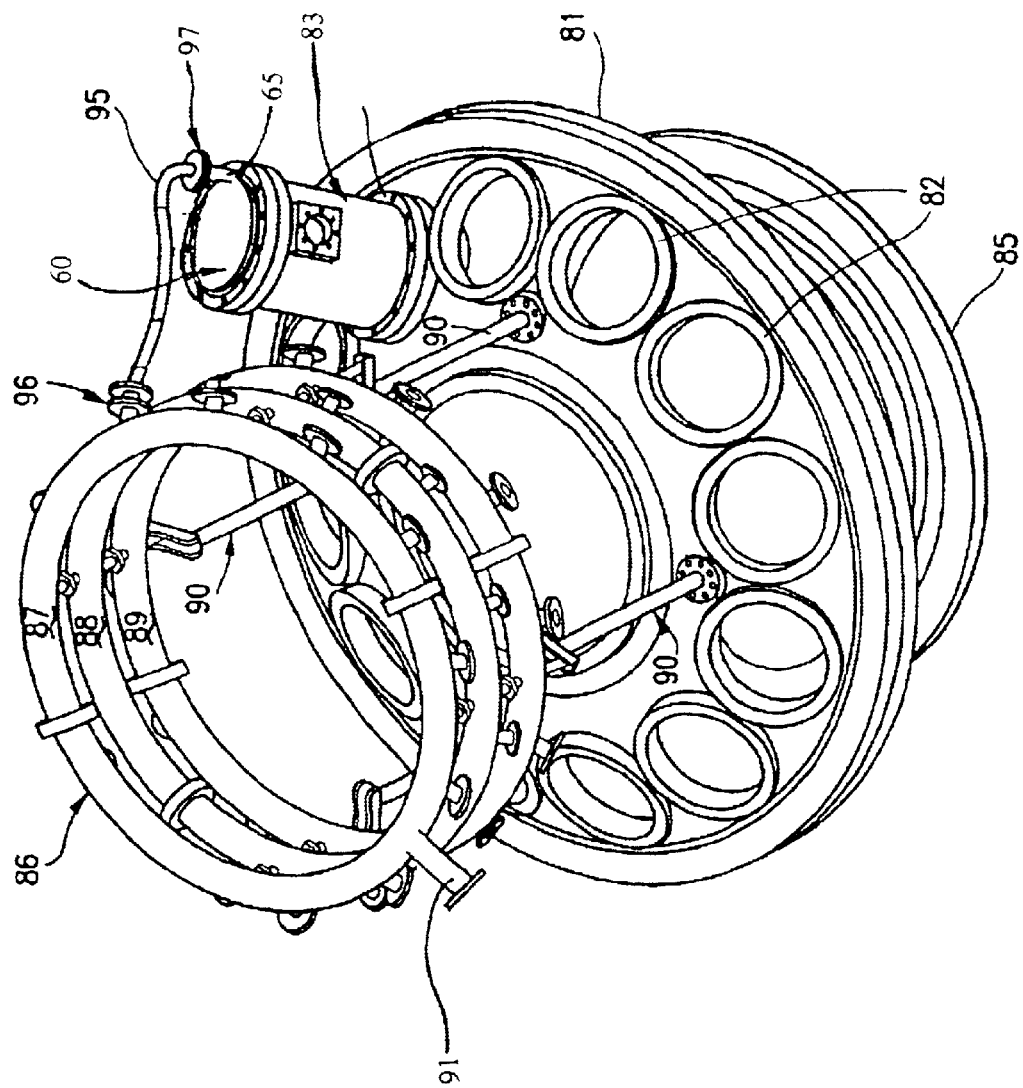
FIG. 4 is a perspective view of a portion of a gas turbine engine incorporating the present invention.

Referring now to FIGS. 2 and 3, an end cover 60 is provided having a first face 62, a second face 63, a first thickness 64 therebetween, a fluid inlet 65, a manifold 66 in fluid communication with fluid inlet 65, a plurality of feed passages 67 in fluid communication with manifold 66, and a plurality of nozzle mounts 68 fixed to second face 63 for receiving nozzles 61, with each nozzle mount 68 in communication with a feed passage 67. In accordance with the preferred embodiment, a generally circular end cover 60 will contain a generally annular manifold 66. Also provided are a plurality of nozzles 61, which can be of any variety, depending on engine requirements, with each nozzle 61 having a nozzle inlet 59 and a plurality of injector holes 69 that yield an effective flow area. Nozzles 61 can inject a variety of fluid mediums depending on the operational requirements, but the fluid medium is typically selected from the group consisting of air, natural gas, diesel fuel, and steam. In operation, the fluid enters end cover 60 through inlet 65 and passes into manifold 66 where it is then fed into multiple feed passages 67 before entering nozzle mounts 68 and nozzles 61. The fluid is then injected into the combustion chamber through injector holes 69.

Individual nozzles have their respective flow rates when measured independently, but may vary from nozzle to nozzle due to manufacturing tolerances. While the nozzles can individually have their effective flow area modified to compensate for these manufacturing tolerances, such that they have essentially an identical flow rate, when then assembled in a system of other nozzles and subject to other conditions, seemingly identical flowing nozzles will no longer flow at the same rate, thereby creating a mal-distribution of fluid flow to a multi-nozzle combustor. Other conditions affecting the effective flow rate of nozzles 61 when assembled within end cover 60 include pressure losses due to area changes within end cover 60, friction effects throughout passages in end cover 60, and mach number and velocity related effects. In addition to pressure losses, the temperature of the fluid passing through end cover 60 and nozzles 61 tends to increase in temperature since end cover 60 and nozzles 61 operate at a higher temperature than the fluid temperature. Therefore, it is necessary to be able to compensate for these additional losses by properly positioning nozzles 61 in order to provide an end cover having a uniform flow rate of fluid from each of its plurality of nozzles.

The additional pressure and temperature related losses are compensated for when determining the location for each nozzle 60 about end cover 61. An end cover 60 and nozzles 61, which have a similar flow rate, as described above, are provided. A fluid medium having a first pressure, a first temperature, and a first flow rate is then provided to fluid inlet 65 of end cover 60. The fluid medium then passes through end cover 60, as previously outlined, and a second pressure and second temperature are determined at each of nozzle inlets 59. Due to the geometry changes and frictional effects within end cover 60, the fluid medium pressure drops throughout the system resulting in a lower second pressure than first pressure. As previously mentioned, end cover 60 and nozzles 61 are exposed to higher temperatures, due to their proximity to the combustor and therefore typically operate at least at engine compressor discharge temperature, which for a typical gas turbine can be upwards of 700 degrees F. As a result, the fluid medium passing through end cover 61, typically a fuel of some type, is cooler and feels the radiation effects as it passes through end cover 60, thereby raising the fluid medium temperature such that its second temperature is higher than its first temperature.

Utilizing the second pressure, a known external pressure outside nozzle 61, which can vary from combustor to combustor, the effective flow area of nozzle 61, and the second temperature, a second flow rate is determined for each of plurality of nozzles 61. Next, by utilizing the first flow rate and second flow rates, each of nozzles 61 are placed in nozzle mounts 68 such that each of nozzles 61 injects the fluid medium into a gas turbine combustor at a generally consistent third flow rate. This generally consistent third flow rate from each of nozzles 61 is possible only when the effects of pressure and temperature changes causing the mal-distribution of fluid flow are compensated for through adjusting the effective flow area of each nozzle. That is, depending on each respective second pressure and second temperature value at each nozzle inlet 59, the diameter of injector holes 69 are modified to account for the resulting higher or lower flowing fluid medium. Injector holes 69 can be opened mechanically to raise the respective nozzle flow rate or can be closed by peening, or rolling over, the edges of the existing holes to restrict and lower the respective nozzle flow rate. Each nozzle 61 of end cover 60 is adjusted as necessary such that they produce a generally consistent third flow rate despite each nozzle receiving a different second pressure and second temperature at its nozzle inlet 59.

The method, as outlined above, for providing a uniform fluid flow from a plurality of nozzles to a combustor can be extended to a gas turbine engine that has a plurality of combustors. Referring now to FIG. 4, an example of a combustion region of a gas turbine engine utilizing a plurality of combustors is shown. Combustor wrapper forward flange 81 contains a plurality of openings 82 for combustors 83, which are arranged about a gas turbine engine. The products of combustors 83 exit towards a turbine (not shown) that is positioned adjacent combustion wrapper aft flange 85. Each of combustors 83 discharge hot combustion gases towards a turbine, with each combustor having its own respective flame temperature. In this embodiment, a plurality of combustors 83 is arranged about combustor wrapper forward flange 81 of a gas turbine engine. Each of combustors 83 has an end cover 60, as previously defined, including a plurality of nozzles 61 such that end covers 60 each have a known assembly flow rate. While the flame temperature variation is significantly reduced by balancing nozzles 61 within end cover 60 to account for flow variation and fluid pressure loss within an end cover, a similar method can be applied to end covers 60 and their position around the engine relative to a supply inlet. Specifically positioning end covers 60 to reduce combustion dynamics and minimize temperature variation experienced by the turbine section would not be necessary if each cover received the same fluid pressure at its respective fluid inlet 65. Unfortunately, most engines utilize a supply system as shown in FIG. 4, which contains only one supply inlet which feeds multiple combustors, thereby resulting in pressure losses throughout the system. In order to provide a completely balanced fluid system for a gas turbine engine containing a plurality of combustors distributed about the engine, that also most effectively utilizes the previously balanced or uniform flow distribution end covers 60, it is first important to understand the components of the supply system.

In fluid communication with end cover 60 is a supply system 86 comprising a main supply tube 87 having a supply inlet 91 and a plurality of conduits 95 extending from main supply tube 87. Each of conduits 95 has a conduit inlet 96 adjacent main supply tube 87, a conduit exit 97 proximate fluid inlet 65 of end cover 60, and an effective flow area. A fluid medium having a first pressure, first temperature, and first flow rate is provided to supply system 86 at supply inlet 91. A second pressure and second temperature are then determined for the fluid medium at each conduit exit 97. Utilizing the second pressure, second temperature, and effective flow area of each conduit, a second flow rate is then determined for each conduit. Once a second flow rate is determined for each conduit 95, it is taken in combination with the first flow rate, and end cover assembly flow rates, which are a function of nozzle effective flow rates, to determine the placement of each end cover 60 about the gas turbine engine, such that each end cover 60 injects a fluid medium to each combustor 83 at a generally consistent third flow rate. This generally consistent third flow rate from each of end covers 60 is possible only when the effects of pressure and temperature changes causing the mal-distribution of fluid flow are compensated for through adjusting the effective flow area of each nozzle on the end cover. Due to the distance between supply system 86 and the combustors 83, the fluid contained within the supply system 86 does not experience quite the amount of temperature change as mentioned previously within end cover 60. Therefore, the primary factor causing the fluid flow mal-distribution is the loss of pressure associated with geometry changes and frictional effects within supply system 86. Depending on each respective second pressure and second temperature value at each conduit exit 97 (or fluid inlet 65 of end cover 60), the effective flow area of each nozzle 61 within end cover 60 is adjusted accordingly, as previously mentioned, to compensate for the resulting fluid flow mal-distribution. Injector holes 69 can be opened mechanically to raise the respective nozzle flow rate or can be closed by peening, or rolling over, the edges of the existing holes to restrict and lower the respective nozzle flow rate. Each nozzle 61 of end cover 60 is adjusted as necessary such that they produce a generally consistent third flow rate despite each end cover receiving different fluid flow rates from the supply system.

What I claim is:

1. A method of providing a generally consistent fluid flow from a plurality of nozzles to a gas turbine combustor, said method comprising the steps:

providing an end cover fixed to said gas turbine combustor, said end cover having a first face, a second face, a first thickness therebetween, a fluid inlet, a manifold in fluid communication with said fluid inlet, a plurality of feed passages in fluid communication with said manifold, and a plurality of nozzle mounts fixed to said second face and in fluid communication with said feed passages;

providing a plurality of nozzles each having a nozzle inlet and plurality of injector holes having an effective flow area;

providing a fluid medium having a first pressure, a first temperature, and a first flow rate to said fluid inlet of said end cover;

determining a second pressure of said fluid medium at each of said nozzle inlets;

determining a second temperature of said fluid medium at each of said nozzle inlets;

utilizing said second pressure, a predetermined external pressure, said effective flow area, and said second temperature, to determine a second flow rate for each of said plurality of nozzles;

utilizing said first flow rate and said second flow rates, to place each of said nozzles at said nozzle mounts, such that each of said nozzles injects said fluid medium to said gas turbine combustor at a generally consistent third flow rate.

2. The method of claim 1 wherein said second pressure is lower than said first pressure.

3. The method of claim 1 wherein said second temperature is higher than said first temperature.

4. The method of claim 1 wherein said plurality of nozzles comprises at least two nozzles.

5. The method of claim 1 wherein said end cover is generally circular in cross section.

6. The method of claim 1 wherein said manifold is generally annular in shape.

7. The method of claim 1 wherein said fluid medium is selected from the group consisting of air, natural gas, diesel fuel, and steam.

8. A method of providing a gas turbine engine having a generally consistent flow of fluid to a plurality of combustors distributed about said engine, said method comprising the steps:

providing a plurality of combustors arranged about a gas turbine engine, each of said combustors having an end cover, said end cover having a first face, a second face, a first thickness therebetween, a fluid inlet, a manifold in fluid communication with said fluid inlet, a plurality of feed passages in fluid communication with said manifold, a plurality of nozzle mounts fixed to said second face and in fluid communication with said feed passages, and a plurality of nozzles fixed to said plurality of nozzle mounts, such that each of said end covers has a known assembly flow rate;

providing a supply system having a supply inlet, main supply tube, and a plurality of conduits extending from said main supply tube, each of said conduits having a conduit inlet adjacent said main supply tube, a conduit exit proximate said fluid inlet of said end cover, and an effective flow area;

providing a fluid medium having a first pressure, a first temperature, and a first flow rate to said supply inlet;

determining a second pressure of said fluid medium at each of said conduit exits;

determining a second temperature of said fluid medium at each of said conduit exits;

utilizing said second pressure, said second temperature, and said effective flow area, to determine a second flow rate for each of said conduits;

utilizing said first flow rate, said second flow rates, and said assembly flow rates, to place each of said end covers about said gas turbine engine and in fluid communication with said supply system such that each of said end covers injects said fluid medium to each of said combustors at a generally consistent third flow rate.

9. The method of claim 8 wherein said second pressure is lower than said first pressure.

10. The method of claim 8 wherein said second temperature is higher than said first temperature.

11. The method of claim 8 wherein said plurality of combustors comprises at least two combustors.

12. The method of claim 8 wherein said plurality of nozzles comprises at least two nozzles.

13. The method of claim 8 wherein said main supply tube is a generally annular ring that encompasses said gas turbine engine.

14. The method of claim 1 wherein said fluid medium is selected from the group consisting of air, natural gas, diesel fuel, and steam.

* * * * *